Patented Oct. 21, 1924.

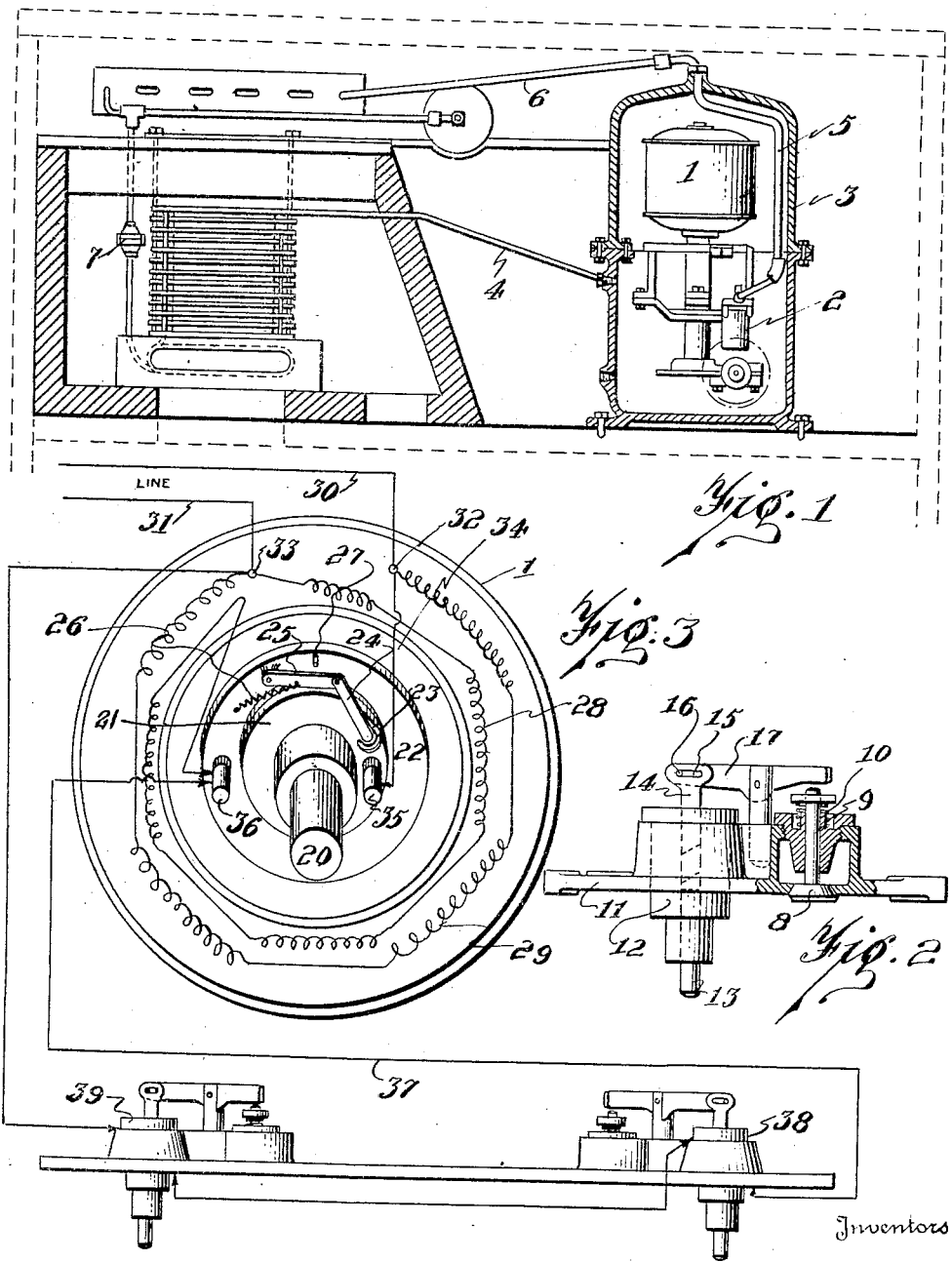

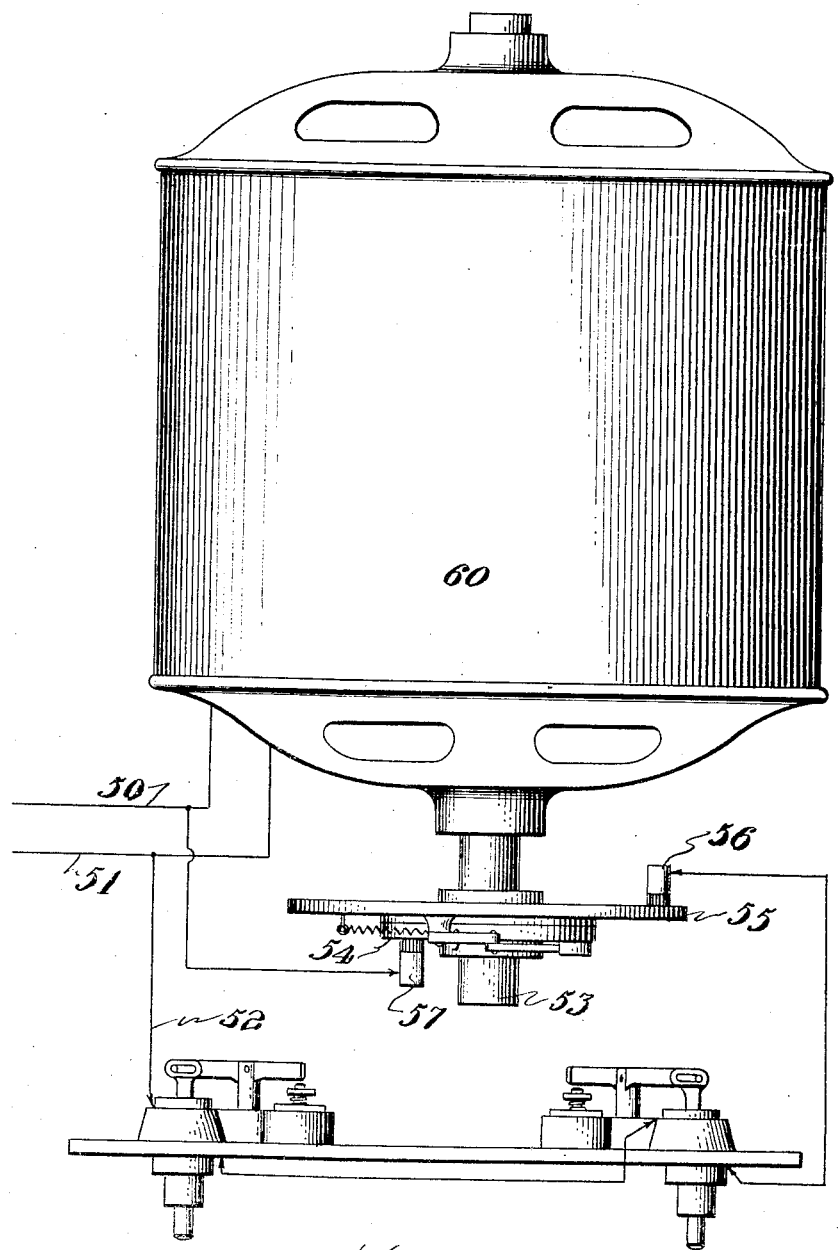

1,512,890

UNITED STATES PATENT OFFICE.

CLARENCE M. HOLLEY AND EARL P. OSWALD, OF DETROIT, MICHIGAN, ASSIGNORS, BY MESNE ASSIGNMENTS, TO THE HOOVER COMPANY, OF NORTH CANTON, OHIO, A CORPORATION OF OHIO.

AUTOMATIC LOAD-CONTROL DEVICE FOR ELECTRIC MOTORS.

Application filed October 23, 1919. Serial No. 332,596.

*To all whom it may concern:*

Be it known that we, CLARENCE M. HOLLEY and EARL P. OSWALD, citizens of the United States, residing at Detroit, county of Wayne, State of Michigan, have invented a certain new and useful Improvement in Automatic Load-Control Devices for Electric Motors, and declare the following to be a full, clear, and exact description of the same, such as will enable others skilled in the art to which it pertains to make and use the same, reference being had to the accompanying drawings, which form a part of this specification.

This invention relates to automatic load control devices for electric motors, the primary object being to provide a means whereby an electric motor may be started independently of the load or while freed from the load and the load be automatically released to the motor upon attainment of its running speed. The fundamental principle of this invention may be applied to either direct or alternating current type of electric motors and this fundamental principle resides in the utilization of a load circuit energized upon energization of the motor or through the energizing circuit of the motor and incorporating in said load circuit an electromagnet for operating mechanism adapted to free the motor from the load during the period of its energization and further incorporating in the said circuit a switch preferably of the centrifugal type but fundamentally a switch of a character to be operated to break the load circuit upon attainment of predetermined speed of rotation of the motor shaft.

Ordinarily electric motors, particularly the smaller type, are started under load and this requires a motor of higher power than is required to carry the load after the starting period. The invention herein disclosed seeks to overcome this defect and may be utilized with what is known as the split-phase type of motor in which case the electro-magnet or load control circuit is in parallel with the starting coil or circuit of the motor and in application to the direct current type of the motor the electro-magnetic circuit is in series with the energizing circuit of the motor. It is to be understood, however, that the invention is the same in either case, and that the mechanism controlled by the electro-magnet may be of such type as may be required by the character of the load and in either case the load controlled circuit is energized upon energization of the motor winding and deenergized upon opening or breaking of the electro-magnet circuit. This fundamental object and the several novel features of the invention are hereinafter more fully described and claimed, and the preferred form of construction embodying our invention is shown in the accompanying drawings in which—

Fig. 1 is a view partly in section of a refrigerating apparatus and motor operated pump for transferring the refrigerant medium from the low to high pressure lines.

Fig. 2 is a detail partly in section showing an electrically controlled inlet valve for the pump.

Fig. 3 is a diagram showing the starting or running coils and centrifugal switch of a split-phase motor in which a pair of solenoids in series are connected in parallel with the starting coil.

Fig. 4 is a diagram showing the load control circuit connected to the energizing circuit for the motor.

It is to be understood that this invention is not limited to the particular load which is here utilized to illustrate the principles of operation of our invention as the load to be assumed may be of any type and electromagnetic device in connection may be of any peculiar construction found necessary due to the character of the load for the controlling thereof and what we have here termed the load mechanism (which fundamentally is the compressor) is utilized to illustrate the manner in which the motor may assume its load or be freed from the load during the starting period.

In the illustration in Fig. 1 the motor 1 and pump 2 are enclosed within a case 3 forming an enlargement of the low pressure lines 4. In the construction shown the inlet valves of the pump open into this chamber and the discharge valves open to a conduit 5 connected directly with the high pressure lines 6 of the system. An expansion valve 7 is utilized between the high and low pressure lines as is usual in artificial refrigerating systems and normally the high pressure line contains pressure up to seventy-five or more pounds per square inch while the lines 4 have a much lower pressure. With the line 5 and 6 filled with compressed fluid from the compressor the motor upon its starting, as usual under heretofore known conditions, must immediately operate under a full load requiring a motor of greater size than is necessary to operate the device when the motor has attained its speed. If the inlet valves be in some manner held open during the starting period and until the motor had attained its predetermined full speed, practically no load is assumed by the motor during this starting period and the principal feature of our invention consists in providing a means for holding this load from the motor during the starting period and thereafter releasing the load to the motor.

In Fig. 2 is shown an inlet valve 8, the stem of which also extends upward through a valve cage and is held closed by a spring 10 of the ordinary type. Normally this valve is closed by the spring and opened by the piston in the cylinder (which is not here shown) as will be readily understood. With this valve held open, the piston may reciprocate without doing any particular work. On the cylinder head 11 is mounted an electro-magnet 12 which may be of the solenoid type as is herein shown. The lower part of the stem 13 is of magnetic metal as iron and the upper part is of non-magnetic metal as brass and the upper end 14 is slotted at 15 to receive a pin 16 of the pivoted lever 17 supported on the case. The opposite end of the lever extends over the end of the stem 9 and normally out of contact therewith due to the weight of the core 13 attached to the end of the lever. If, during the starting of the motor the solenoid 12 be energized, the valve 8 is held open by the lever 17 and by arranging the parts so that normally a space of about one-sixteenth of an inch is provided between the end of the stem 9 and the end of the lever, a slight hammer like blow is given upon energization of the solenoid which will free the valve from its seat.

The diagram Fig. 3 shows the end of the motor 1, a shaft of the motor 20 on which is mounted a disc 21 and a disc 22 of large diameter, and it is to be understood that these discs are insulated from each other and from the shaft. The disc 21 has a notched lug 23 thereon which engages the end of a lever or bar 24 pivotally connected to a bar 25 which in turn is pivoted to the disc 22. The bars 24 and 25 are held in the position shown in Fig. 3 by a coiled spring 26 and a pin 27 is provided on the disc 22 limiting the extent of movement of the bar 25 under centrifugal action. The mechanism described is the well known centrifugal switch used on motors of this type to break the starting circuit. The motor is of the usual split-phase type provided with starting coils diagrammatically shown at 28. A supply circuit is shown at 30 and 31 connected respectively to the binding posts 32 and 33 and to which each end of the running coils 29 are connected as shown. To the post 32 is connected a line connected to a brush 35 riding in contact with the disc 21. The starting coils are attached at one end to the post 33 and line 31 and at the other end to a brush 36 riding in contact with the disc 22. This constitutes the electric wiring of a split-phase motor and upon closing the circuit to the motor the starting circuit, which is closed by the centrifugal switch, is energized and the motor started and, upon the breaking of the switch by the centrifugal action, the current is entirely discharged into the running coils, the starting circuit remaining broken. In order that the motor may be freed from the load during the starting thereof we have provided what we have termed a control circuit 37 shown in Fig. 3 in which are connected a pair of electro-magnets 38 and 39 in series in the said circuit, each electro-magnet being 55 volt type for 110 volt circuit or 110 volt type for a 220 volt circuit. One end of the circuit 37 is connected to the post 33 and line 31 and the other end of the circuit 37 is connected to the brush 36 of the centrifugal switch and is in parallel with the starting coils and is energized upon energization of the starting coils and de-energized upon the breaking of the starting coil circuit by the switch.

By the construction shown the electro-magnets and mechanism for holding the inlet valves 8 of the pump open when the switch for the motor is closed and a starting coil energized, the valves are held open due to the energization of the electro-magnets permitting the pump to operate without load other than that of friction involved in the reciprocation of the pistons and operation of the various parts. The motor will thus operate without its normal load during the period in which the starting circuit is energized. When sufficient speed has been attained to throw the centrifugal switch (which may be of any approved type) the starting circuit and the electro-magnet circuit are both simultaneously broken and full current then delivered to the running coils. The motor is continued in operation due to energization of these coils and, the circuit for the electro-magnets being broken, the inlet valves are closed under action of the springs therefor and the motor assumes its normal load in the instance shown drawing gas from the chamber in the low pressure line and discharging it to the high pressure line.

In the direct current type of motor illustrated in Fig. 4 the motor is diagrammatically illustrated at 60 and the energizing circuit therefor at 50 and 51. Connected across this circuit is the electro-magnet or load circuit 52 in which are one or more electro-magnets as in the motor shown in Fig. 3. On the motor shaft 53 is the insulated discs 54 and 55 of the centrifugal switch on which the brushes 56 and 57 ride. This switch is the same switch shown in Fig. 3 and it is to be understood that the switch is broken upon attainment of predetermined speed by mechanism similar to the levers 24 and 25 shown in Fig. 3 but not shown in Fig. 4. Upon closing of the circuit 50 and 51 to energize the motor, the electro-magnet circuit 52 is energized, the centrifugal switch being closed when the motor is idle. Upon energizing the motor the shaft 53 begins to rotate and, upon attainment of predetermined speed, the switch is thrown open breaking the electro-magnet circuit and releasing the mechanism controlled by the electro-magnet of the circuit causing the motor to assume its load as in the case shown in Fig. 3. It is thus evident that the principles of the invention may be applied either to direct or alternating current type of motor and furthermore is not limited in this application to any particular type.

It will, of course, be readily understood that electric motors are utilized with loads of various types which will demand a different construction of mechanism controlled by the electro-magnets for freeing the motor from load during the starting period. Thus, it is to be understood that the invention is not confined to the particular mechanism employed to free the motor from load during the starting period. The essential characteristic is that a circuit and electro-magnetic device therein is energized upon energization of the motor circuit and de-energized mechanically upon attainment of predetermined speed.

We have shown in Fig. 3 two electro-magnets connected in the load control circuit. This is only essential wherein the two cylinders or mechanisms are to be controlled. If a single cylinder pump be utilized as a load for the motor a single solenoid only may be used to control a single inlet valve in which case the solenoid should be wound to take a voltage equal to that of the motor circuit, and thus various changes may be made in the mechanism for freeing the motor from load to correspond to the various characters of load for which the motor may be utilized.

Having thus fully described our invention, what we claim and desire to secure by Letters Patent of the United States is—

1. An automatic load control device for electric motors adapted to release the same from load during the starting period comprising a normally closed switch controlled by rotation of the motor shaft to open the same on attainment of predetermined speed of rotation, a circuit for the switch adapted to be energized upon energization of the motor winding, an electro-magnet in the switch circuit, and mechanism controlled thereby adapted to disconnect the load from the motor during the period of energization of the magnet.

2. An automatic load control device for electric motors adapted to release the same from load during the starting period comprising a centrifugal switch on the motor shaft adapted to open on attainment of predetermined speed thereof, a circuit in which the switch is located adapted to be energized upon energization of the motor winding, an electro-magnet in the switch circuit, and mechanism controlled thereby adapted to disconnect the load from the motor during the period of energization of the switch and magnet circuit.

3. An automatic load control device for electric motors having a starting circuit, an automatic switch therein, a running circuit, comprising a circuit in parallel with the starting circuit, an electro-magnetic device in the said parallel circuit, and mechanism controlled by said electro-magnet of a character to free the motor from load during energization thereof.

4. An automatic load control device for electric motors comprising a starting circuit, an automatic switch therein, a running circuit, a load control circuit in parallel with the starting circuit, and electro-magnetic means for holding the load disconnected from the motor during energization of the magnet and starting circuit.

5. An automatic load control device for electric motors comprising a starting circuit including a centrifugal switch, a running circuit for continued operation of the motor, a load control circuit in parallel with the starting circuit, electro-magnetic means in the said load control circuit adapted upon energization to free the motor from load during energization thereof and permit assumption of load by the motor on breaking of the starting circuit.

6. The combination with a split-phase motor having a starting winding and a running winding, of mechanism of a character adapted to disconnect the load from the motor, electro-magnetic means for operating the same, a circuit for the said electro-magnetic means in parallel with the starting winding, and switch mechanism in the starting winding adapted to break the circuit on the attainment of predetermined speed by the motor.

7. An automatic load control device for electric motors having a starting circuit and a running circuit, comprising an electro-magnetic device for each of a series of load elements, a circuit for the said electro-magnetic devices, the said circuit being in parallel with the starting circuit and the electro-magnetic devices being in series in the said circuit therefor, each electro-magnetic device being wound to take an equal portion of voltage of the starting circuit, the sum of which is equal to the line voltage and mechanism controlled through energization of the electro-magnets to disconnect the load from the motor during the period of energization and connect the load with the motor upon de-energization thereof.

8. An automatic load control device for electric motors comprising a running circuit, a starting circuit and a load control circuit, an automatic switch controlling the starting circuit and the load control circuit, and electromagnetic means included in the load control circuit for releasing the load from the motor during energization of the starting circuit.

In testimony whereof, we sign this specification.

CLARENCE M. HOLLEY.
EARL P. OSWALD.